June 16, 1925.                                                          1,541,994
N. J. NIELSEN
PROCESS FOR CONTINUOUSLY STERILIZING MILK AND THE LIKE
Filed June 28, 1924
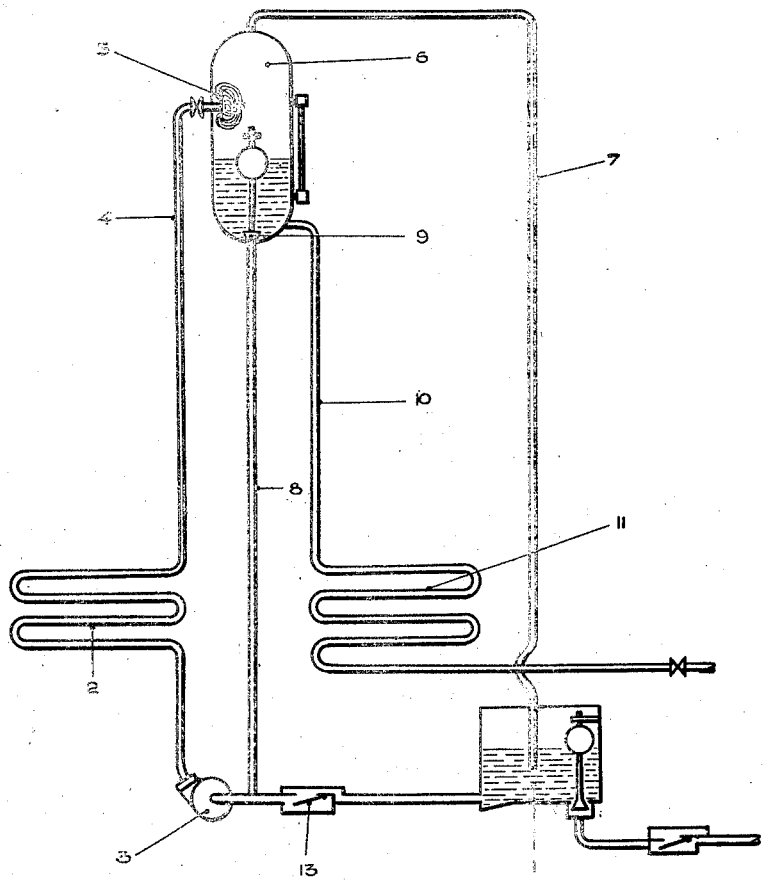
Inventor
N. J. Nielsen
by Marks & Clerk Patented June 16, 1925.

1,541,994

UNITED STATES PATENT OFFICE.

NIELS JONAS NIELSEN, OF AARHUS, DENMARK.

PROCESS FOR CONTINUOUSLY STERILIZING MILK AND THE LIKE.

Application filed June 28, 1924. Serial No. 723,025.

*To all whom it may concern:*

Be it known that I, NIELS JONAS NIELSEN, manufacturer, a subject of the King of Denmark, residing at 15 Frederiksgade, Aarhus, Denmark, have invented certain new and useful Improvements in or Relating to Processes for Continuously Sterilizing Milk and the like, of which the following is a specification.

My present invention relates to processes for sterilizing milk or similar liquids by continuously passing the liquid through a heated tube system or the like under pressure.

The object of my invention is to reduce the consumption of heat, for instance, steam, and also to reduce the consumption of cold in the case of using after the heating tube system a cooling tube system or the like in which the sterilized milk is being cooled down to about ordinary temperature in order to be filled in transport cans or the like.

The invention consists chiefly in enabling the hot milk under pressure to boil by passing it through a chamber of lower pressure that is ordinary air pressure, and allowing the milk vapours thus developed to be condensed in the milk passing to the heating system.

Through the evaporation, the hot milk is deprived of a certain heat quantity depending on the difference between the pressure or the temperature in the heating system and the pressure or the temperature in the evaporation chamber. Through the condensation of the milk vapours in the fresh milk, a corresponding heat quantity is transferred to it, whilst the cooler if such used, is freed of a corresponding part of its work.

To have my invention fully understood I have illustrated it on the accompanying drawing by way of an example.

A pump 3 inserted between a feeding tank 1 and the heating system 2, passes the milk through the heating system and therefrom through a tube 4, provided with a pressure valve 5 into the evaporation or boiling chamber 6 which is exposed to about ordinary pressure through a tube 7 leading into the open feeding tank 1.

The bottom of the chamber 6 is connected with the feeding tube of the pump 3 through a tube 8 provided with a float valve or the like 9 by means of which a suitable milk level is maintained in the chamber 6.

From the lower part of the chamber 6 or the milk space a tube 10 leads to the cooler 11 and therefrom through a valve or cock 12 to one or more canning places or the like not shown on the drawing.

When passing the pressure valve 5 the milk heated up to about 130° centigrade will boil, and the vapours thus developed at about 100° centigrade, pass through the tube 7 to the tank 1 where the vapours become condensed in the fresh milk.

If the valve or cock 12 is closed, or if the milk quantity circulated by the pump 3 exceeds the milk quantity being canned, the milk level will rise. When the milk level is sufficiently high the float valve 9 is opened and the milk is returned by the tube 8 to the pump so as to circulate again through the heating system.

If in a given moment the milk quantity canned exceeds the quantity of hot milk simultaneously passing the heating system, no damage or inconvenience will result as the milk capacity of the chamber 6 is sufficiently great to equalize the difference.

The necessary pressure for passing the milk through the cooler and the canning devices or the like, may be obtained by arranging the chamber 6 as an upper or overhead cistern so that the tube 4 connecting it with the heating system, is a rising tube, while the tube 10 connecting it with the cooler, is a drop tube. Moreover the heating system and if desired also the cooler, may be arranged in the same height as the evaporating chamber, and the drop tube may be arranged after the cooler. The pressure valve 5 may be arranged at a suitable point of the tube 4, if desired directly behind the heating system.

One or more check valves 13 in the feeding conduit, prevent back flow of the milk.

The float valve or the like 9 may be regulated in such a manner that the above mentioned closed circulation of the milk through the heating system takes place to such an extent that normally only one third to one sixth of the milk quantity circulated through the heating system passes to the cooler.

When working in this manner that is by repeatedly passing the liquid through the heating system the present plant may be used for the production of condensed milk or the like, the tube 7 being in this case omitted so that the milk vapours are not condensed in the fresh or circulating milk but allowed to escape to the air to a condenser of lower pressure.

I claim:

A process for sterilizing milk or a similar liquid by continuously passing the liquid through a heated tube system or the like under pressure, characterized in passing the liquid when leaving the heating system, through a chamber of lower pressure and condensing the vapours thus developed in the liquid passing to the heating system, thus depriving the sterilized hot liquid of heat and preheating the fresh liquid.

In testimony whereof I hereunto affix my signature in the presence of two witnesses.

NIELS JONAS NIELSEN.

Witnesses:
 WM. COUEL,
 A. CHRISTAFFERSEN.